United States Patent
Beyer et al.

(10) Patent No.: US 7,483,910 B2
(45) Date of Patent: Jan. 27, 2009

(54) AUTOMATED ACCESS TO WEB CONTENT BASED ON LOG ANALYSIS

(75) Inventors: Kevin Scott Beyer, San Jose, CA (US); Jussi Petri Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 10/042,367

(22) Filed: Jan. 11, 2002

(65) Prior Publication Data
US 2003/0135487 A1    Jul. 17, 2003

(51) Int. Cl.
G06F 17/00    (2006.01)
(52) U.S. Cl. .................. 707/102; 707/100; 707/101; 707/3
(58) Field of Classification Search .............. 707/3, 707/4, 5, 10, 100–102; 705/10
See application file for complete search history.

(56) References Cited

U.S. PATENT DOCUMENTS

| | | | | |
|---|---|---|---|---|
| 6,119,101 A * | 9/2000 | Peckover | ............. | 705/10 |
| 6,363,377 B1 * | 3/2002 | Kravets et al. | .............. | 707/4 |
| 6,438,539 B1 * | 8/2002 | Korolev et al. | .............. | 707/3 |
| 6,516,312 B1 * | 2/2003 | Kraft et al. | .............. | 707/3 |
| 6,631,369 B1 * | 10/2003 | Meyerzon et al. | ............. | 707/4 |
| 6,665,658 B1 * | 12/2003 | DaCosta et al. | ............. | 707/3 |
| 6,738,780 B2 * | 5/2004 | Lawrence et al. | .......... | 707/101 |
| 6,785,671 B1 * | 8/2004 | Bailey et al. | ............. | 707/3 |
| 7,120,629 B1 * | 10/2006 | Seibel et al. | ............. | 707/5 |
| 7,120,692 B2 * | 10/2006 | Hesselink et al. | .......... | 709/225 |
| 2001/0032205 A1 * | 10/2001 | Kubaitis | ............. | 707/10 |
| 2002/0103823 A1 * | 8/2002 | Jackson et al. | .......... | 707/501.1 |
| 2003/0088544 A1 * | 5/2003 | Kan et al. | ............. | 707/3 |
| 2003/0115189 A1 * | 6/2003 | Srinvasa et al. | ............. | 707/3 |

OTHER PUBLICATIONS

Informia: a Meditator for Integrated Access to Heterogenous Information Sources,{cube root}{cube root}by Barja et al., published by ACM, 1998.*

Effective Web Data Extraction with Standard XML Technologies, {cube root}{cube root}by Myllymaki, published by ACM, May 2001.*

* cited by examiner

*Primary Examiner*—Sana Al-Hashemi
(74) *Attorney, Agent, or Firm*—IP Authority, LLC; Ramraj Soundararajan; Leonard Guzman

(57) ABSTRACT

The present invention provides a manner for providing Web crawlers capable of efficiently accessing Web content not accessible via static hyperlinks. Log files are maintained of communications between a Web browser and a Web server resulting from real user accesses to the content associated with dynamic hyperlinks. These log files represent past user's accesses to the content and are used to generate Web crawler accesses. This approach allows a crawler to accurately mimic real users, resulting in a capability of the crawler to automatically access all the content that real users would have access to.

10 Claims, 3 Drawing Sheets

US 7,483,910 B2

AUTOMATED ACCESS TO WEB CONTENT BASED ON LOG ANALYSIS

BACKGROUND OF THE INVENTION

1. Field of Invention

The present invention relates generally to the field of automated retrieval of World Wide Web documents. More specifically, the present invention is related to automated retrieval of World Wide Web documents not available via static hyperlinks.

2. Discussion of Prior Art

A search engine is a program that searches documents for specified keywords and returns a list of the documents where the keywords were found. Although search engines are a general class of programs, one well-known type of search engine enables users to search for Web pages on the World Wide Web ("Web").

These search engines typically work by using a program, known as a Web crawler, that fetches as much Web content (i.e., hypertext markup language (HTML) pages and other documents) from the Web as possible. Another program, called an indexer, then reads the fetched documents and creates an index based on the words contained in each document.

Web crawlers find and fetch Web content by following hyperlinks, which are Uniform Resource Locators (URLs), appearing in the body of HTML pages. A limitation in today's Web crawlers is that they only follow static hyperlinks, i.e. links in which the full URL is plainly visible in the HTML document and easily extracted by the crawler.

In contrast, there is a large volume of content available on the Web that is not accessible via static hyperlinks. This content is generated dynamically based upon user interactions with the Web site. One example is the content that resides in Web databases. Generally, this content is accessible only through directed queries resulting from HTML forms. Without a directed query, content in the database is not published. When the database is queried, the results are returned as dynamic Web pages in real-time.

It would be beneficial for Web crawlers to be able to retrieve the additional content that is not accessible via static hyperlinks, especially since the content generated in response to following HTML forms typically originates from proprietary databases containing highly valuable competitive information. For instance, Amazon.com™ has a database of millions of books that it sells; yet static hyperlinks (in the form of browsable categories) are provided only to the bestsellers in different categories, not the entire database. Therefore, a Web crawler that only follows static hyperlinks will see only a small fraction of the entire database.

For a Web crawler to access this content, it has to emulate the communications between a Web browser and the Web server that results from user interaction with the Web site. For instance, for Web databases accessible via HTML forms, what a user places in the input items of the form is encoded in an HTTP message or a URL, which is used to query the database. For a Web crawler to access the content in the Web database behind the form, it has to generate similar HTTP messages or URLs that contain valid and relevant entries in the input items of the form. Therefore, to generate such synthetic queries, a Web crawler has to determine what to place in various input items appearing in a form. There are difficulties, however, in determining what to place in the various input items.

Generally, there are two main types of input items appearing in a form: selection items (pulldown menus, check boxes, radio buttons, etc.) and text entries. While it is possible for a Web crawler to compute all possible combinations of selection items and produce an exhaustive list of alternatives, this results in a very inefficient method for content access. Furthermore, the Web site hosting the content may cut the Web Crawler off after noticing the onslaught of crawler accesses.

Text entries present a related but different problem. The Web crawler has little or no idea what to enter as text, since the form itself gives little, or no, information (e.g. data type, valid values, meaning of the variable, expected outcome, etc.) that could be used for such determination. Text entries can be used for entering personal information such as usernames and addresses, but most commonly they are used for entering free-text queries (e.g. search Amazon.com's book database by author name).

Therefore, to generate synthetic queries for a Web database, a Web crawler needs an understanding of the form variables for the database. Further, to extract data efficiently from a Web database, a Web crawler must issue intelligent queries rather than indiscriminate combinations that may not have any relevance. What is needed, then, is a Web crawler that not only accesses content contained in a Web database, but that accesses it by generating realistic data for the form front-end, in order to be able to access the largest possible fraction of the database behind the form. More generally, what is needed is a Web crawler that efficiently mimics a real user's interaction with a Web site to automatically access the largest possible amount of content not available via static hyperlinks.

SUMMARY OF THE INVENTION

The present invention solves the previously described problems by relying on past user accesses to the Web sites to be crawled. This approach allows a crawler to accurately mimic real users, resulting in a capability of the crawler to automatically access all the content that real users would have access to. The result is a crawler that is able to access a vastly larger set of Web documents than before.

In one aspect of the present invention, a method of determining parameter combinations for automated access to World Wide Web content that is accessible based on parameters resulting from real user interactions with a World Wide Web site is provided. Generally, at least one log file is maintained that contains at least one set of parameters resulting from real user interactions with the World Wide Web site. This log is then analyzed to determine the parameter combinations for automated access to the World Wide Web content.

In a second aspect of the present invention, a method of determining entries for input items of an HTML form for automated accesses to content contained in a Web database is provided. Generally, a log of real user entries for the input items of the HTML form is maintained. This log is then analyzed to determine entry combinations for said input items.

In a third aspect of the present invention, a method of emulating real user access to World Wide Web content dynamically accessible via an HTML form is provided. Generally, a log containing real user entries into each input item of said HTML form is maintained. The entries for each input item are then ranked according to their frequency of occurrence. Next, entries ranked below a predetermined number are excluded for each unlimited text entry input item. Combinations of entries from each set of entries are determined and the content is automatically accessed using the combinations of entries.

In a fourth aspect of the present invention, an article of manufacture is provided. The article of manufacture comprises a computer usable medium having computer readable program code embed therein to determine parameter combinations for automated access to World Wide Web content that is accessible based on parameters resulting from user interactions with a World Wide Web site. The computer readable program code comprises computer readable program code for maintaining at least one log file representative of real user interactions with the World Wide Web site and for analyzing the log file to determine parameter combinations for automated access to the World Wide Web content.

DESCRIPTION OF THE PREFERRED EMBODIMENTS

Figure 1:
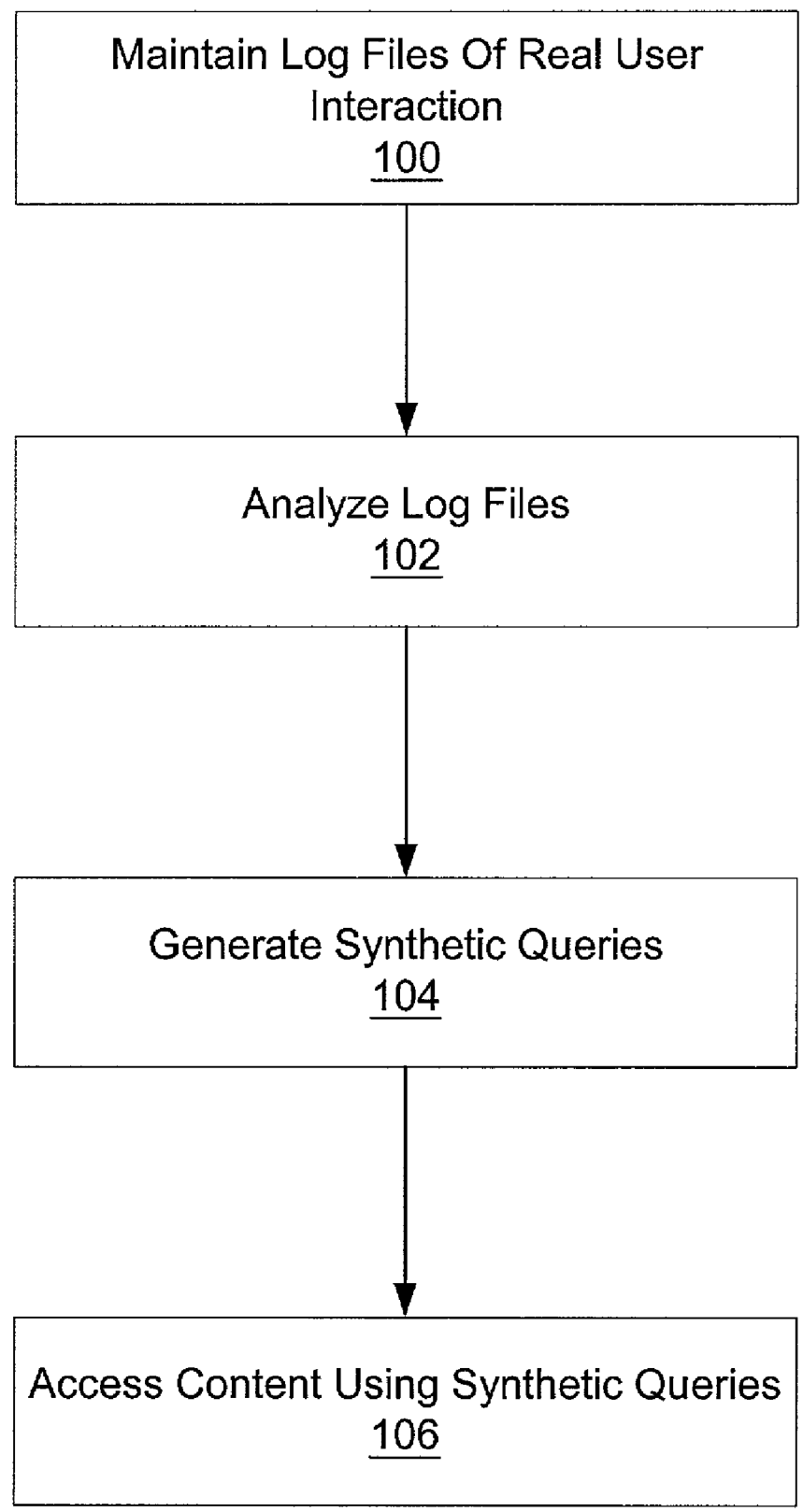
FIG. 1 illustrates a method according to the present invention to automatically retrieve content from Web databases accessible via HTML forms.

While this invention is illustrated and described in a preferred embodiment, the present invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Operation of the Invention

Generally, the present invention provides a manner for providing Web crawlers capable of efficiently accessing Web content not accessible via static hyperlinks. Log files are maintained of the communications between a Web browser and a Web server resulting from real user accesses to the content associated with dynamic hyperlinks. These log files represent past user's accesses to the content and are used to generate Web crawler accesses. This approach allows a crawler to accurately mimic real users, resulting in a capability of the crawler to automatically access all the content that real users would have access to. The result is a crawler that is able to index a vastly larger set of Web documents than before.

As previously described, one of the most prominent sources of Web content associated with dynamic hyperlinks are Web databases accessible through HTML forms. While the present invention is described using Web databases and HTML forms, it is to be understood that the present invention is not limited thereto. For instance, cookies, certificates, and client side scripting are similarly alternatives to static hyperlinks for providing access to Web content.

FIG. 1 illustrates a method according to the present invention to automatically retrieve content from Web databases accessible via HTML forms. First, log files are maintained of the communications between a Web browser and a Web server resulting from real users accessing the Web databases through interactions with an HTML form (step 100). This log information is analyzed and reasonable parameter combinations are chosen for subsequent crawling (step 102). From the analysis of the log files, synthetic queries are generated to access content in the Web databases (step 104). These synthetic queries are then used to access content in Web databases (step 106).

During the analysis of the log files, there are three different categories of input items in an HTML form that are distinguished: selections from predefined sets, limited text entries, and unlimited text entries.

In the first category are items whose settings are selected from a predefined set of alternatives. One or more alternatives may be selected. For instance, a pulldown menu may allow the user to select one or several options. Check boxes can be individually selected ("enabled"), whereas radio buttons are mutually exclusive: only one button from a group of buttons may be selected. An analysis of the log will indicate which input item selections are allowed or are most common and should be used by the Web crawler. Unique combinations of input items that belong to the first category are stored and ranked according to the number of their occurrences. For example, consider an HTML form that has two single-select pulldown menus labeled "Database" and "Sort Order." The first menu has options "Product Catalog" and "Press Releases." The second menu has options "By Date" and "By Relevance." There are four possible combinations a user can choose from in this form. The combination that is the most frequently selected is ranked highest, while the combination that is the least frequently selected is ranked lowest. A possible result of this analysis might be:

TABLE 1

| Rank | Occurrences | Selection |
| --- | --- | --- |
| 1 | 4325 | Database=ProductCatalog and SortOrder=ByRelevance |
| 2 | 2099 | Database=NewsReleases and SortOrder=ByRelevance |
| 3 | 637 | Database=NewsReleases and SortOrder=ByDate |
| 4 | 164 | Database=ProductCatalog and SortOrder=ByDate |

In the second category are text entries that, based on the log analysis, have only a small number of possible unique values (say, 20). For instance, a text entry for "Book Category" might take values such as suspense, children's, mystery, and so on. An analysis of the log will indicate the number of unique entries for a particular text entry and what those entry values are. As part of the analysis, stopwords are removed from the entry values and the resulting values are then stemmed. For instance, an entry like "investments" will be reduced to "invest" which matches another entry like "investing." The unique values are ranked based on the number of their occurrences. An analysis of an HTML form that has two text entries with limited values (Book Category and Area Code) might produce the following result:

TABLE 2.1

| | Parameter: BookCategory | |
| --- | --- | --- |
| Rank | Occurrences | Selection |
| 1 | 2334 | suspense |
| 2 | 2099 | myster (stemmed from mystery, mysteries, mysterical, etc.) |
| 3 | 637 | child (stemmed from children, children's, etc.) |

TABLE 2.2

Parameter: AreaCode

| Rank | Occurrences | Selection |
|------|-------------|-----------|
| 1 | 12381 | 408 |
| 2 | 10223 | 415 |
| 3 | 2637 | 650 |
| 4 | 123 | 212 |

The third category contains text entries that have a large or unlimited range of possible values. The query field of search engines falls under this category. Stop words are removed from the text entries and the remaining words are stemmed. The resulting unique entries are ranked based on the number of their occurrences. An analysis of an HTML form that has one unlimited text entry (Query) might produce the following result:

TABLE 3

Parameter: Query

| Rank | Occurrences | Selection |
|------|-------------|-----------|
| 1 | 23423 | ventur capital startup (stemmed from "venture capital for startups") |
| 2 | 22231 | silicon valley |
| 3 | 11122 | web technolog (stemmed from "web technologies") |
| ... | ... | ... |
| 929192 | 1 | invest microsoft (stemmed from "investing in microsoft") |

Queries for Web databases are synthesized in the following manner. First, a maximum is set for the number of top-ranking unlimited text entries to be used in the synthesis. For instance, selecting 1,000 as the maximum would exclude anything ranked below the 1,000th value in the ranked lists. Next, all combinations of entries in the different parameter tables are computed. For example, every entry in Table 1 is paired with every entry in Table 2.1, which is paired with every entry in Table 2.2, which again is paired with every entry in Table 3. This produces 48,000 different queries, assuming that the maximum number of unlimited text entries was chosen to be 1,000.

Exemplary Hardware Environment

Figure 2:
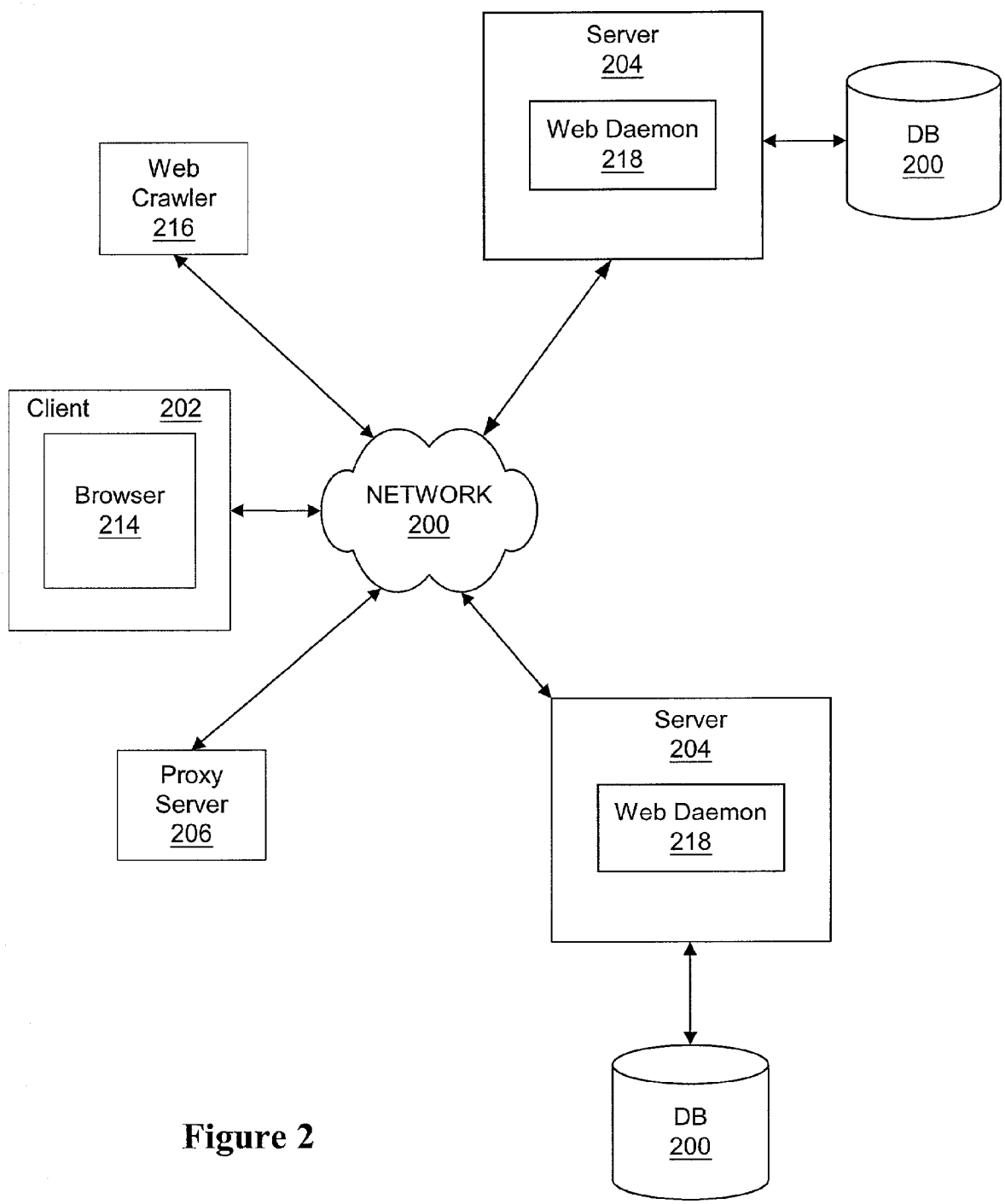
FIG. 2 schematically illustrates an exemplary computer hardware environment for use with the present invention.

FIG. 2 schematically illustrates an exemplary computer hardware environment for use with the present invention. More particularly, FIG. 2 illustrates a typical distributed computing architecture in which client computers 202, servers 204 and proxy servers 206, as well as possibly other resources, are connected. Servers 204 typically are personal computers, workstations, minicomputers, or mainframes, while client computers 202 are typically personal computers, or workstations.

To exchange data with servers 204, client computers 202 have hardware and execute client software, such as Web browsers 214, to create connections to servers 204 utilizing communications protocols, such as TCP/IP and HTTP. Servers 204 additionally have hardware for such connections and execute server software such as Web daemons 218. When servers 204 execute Web Daemons 218, such servers 204 are known as Web servers. Client computers 202 connected to Web servers 204 normally retrieve human readable data as web pages written in a mark-up language such as HTML. Web servers 204 are connected to Web databases 200, which are accessible by interaction with HTML forms presented by Web servers 204.

A Web crawler 216 automatically fetches as much Web content as possible from Web servers 204. In general, Web crawler 216 comprises computer readable data and instructions. When read, interpreted, and executed by any appropriate processor capable of communication with proxy server 206 and Web server 204, the computer readable data and instructions causes the executing processor to perform steps according to the present invention.

Generally, the data and instructions of Web crawler 216 are embodied in and readable from computer usable storage media, such as magnetic tape, optical disc, compact disc, hard disk, floppy disk, ferroelectric memory, EEPROM, flash memory, EPROM, ROM, DRAM, SRAM, SDRAM, ferromagnetic memory, optical storage, charge coupled devices, smart cards or any other appropriate static or dynamic memory, data storage devices, or remote devices coupled to the respective processor via a data communications device (not shown).

Corporations, Internet service providers (ISPs), and even some countries often operate a centralized proxy server through which all their Web traffic is routed. In this case, rather than connecting directly to servers 204 and retrieving the data, client computers 202 connect first to a proxy server 206. Client computer 202 then indicates to proxy server 206 the Web content to be retrieved from server 204. Proxy server 206 then retrieves this content from server 204 on behalf of client computer 202 and forwards the retrieved data to client computer 202.

Figure 3:
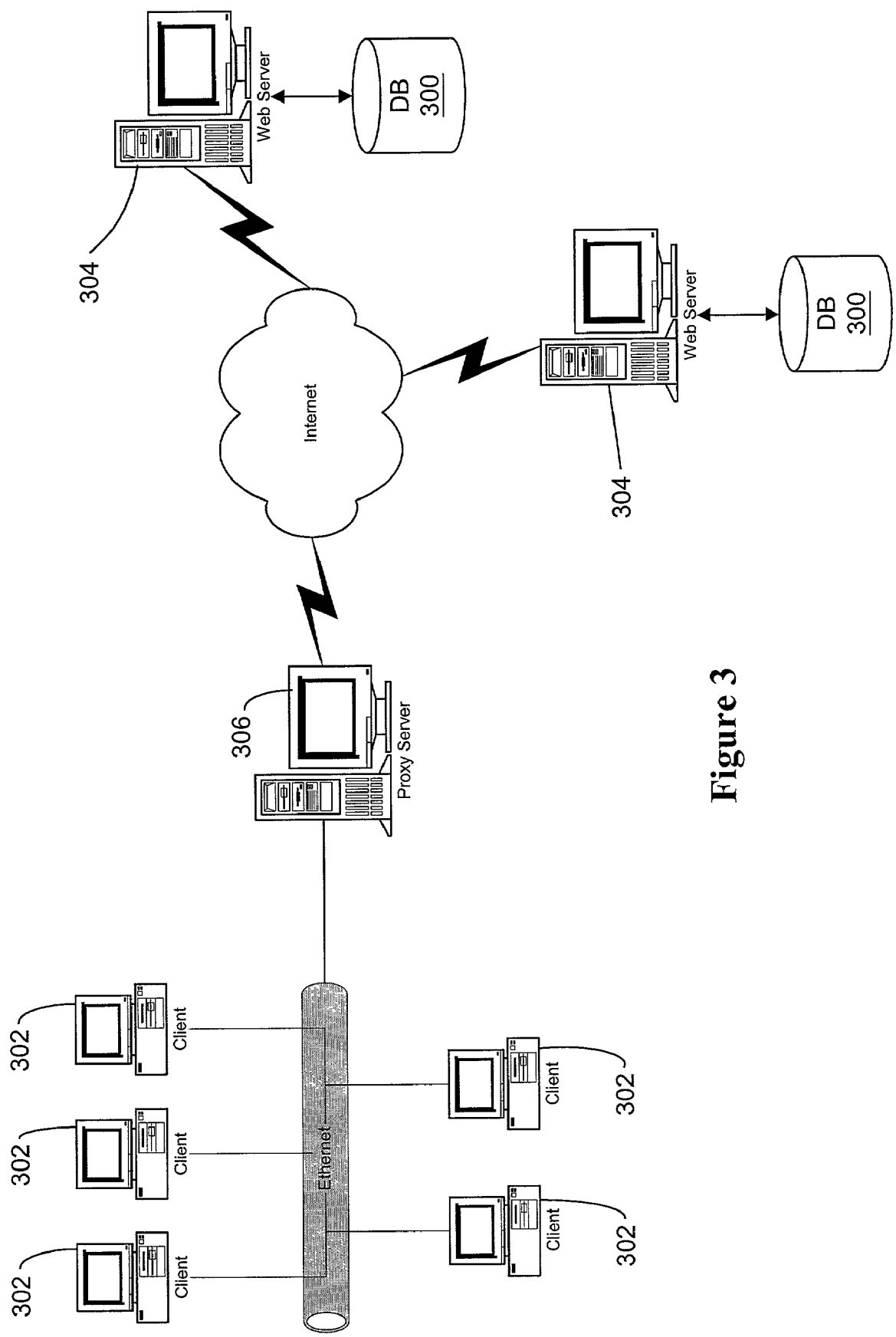
FIG. 3 illustrates the use of a proxy server as a gateway between an internal network and the Internet.

Typically, when proxy servers are used, they are used as a gateway between an internal network and the Internet. This is illustrated in FIG. 3. As shown, clients 302 are connected to each other and proxy server 306 via an internal network (in most cases a LAN with private address numbers as specified in RFC 1597). Proxy server 306 receives requests for Web content from clients 302 or other resources connected to the internal network. Proxy server 306 then forwards the request to the appropriate one of Web servers 304 on the Internet. If the appropriate Web server on the Internet sends a reply, this is accepted by proxy server 306 and forwarded back to the requesting client 302 or resource on the internal network.

Proxy servers generally record Web traffic in log files. These log files record Web accesses of all kinds, including accesses to dynamic content that a Web crawler owner might want to crawl. For instance, if a target Web site is important to a corporation for business reasons (e.g. to get competitive data), it is very likely that employees of that corporation have accessed the Web site interactively in the past and continue to do so in the future. This means that their proxy log contains a large number of valid accesses to the Web site by real users. By "valid" it is meant that real users have interacted with the HTML form of the target Web site and entered valid data, such as names of real authors if the form was for an author search of a book catalog. Also, the users have made reasonable selections in pulldown menus, checkboxes, and radio buttons.

In one embodiment of the present invention, proxy log files are used to generate synthetic queries such that a Web crawler 316 can access content that is generally only accessible by HTML forms or other dynamic links. Thus, for instance, proxy server 306 of FIG. 3 may be a proxy server for a corporation's marketing department that performs Web research to gather information for competitive analysis. Proxy server 306 maintains a log of the appropriate communications between the browsers and Web servers resulting from user accesses to Web databases using HTML forms. When a proxy server is used as illustrated in FIG. 3, Web crawler 316 is typically executed on a client 302 located on the internal network, however, the present invention is not limited thereto. The log files of proxy server 306 are accessed by Web crawler 316 and analyzed to generate synthetic queries to access Web databases 300. Web crawler 316 then issues these synthetic queries to access and index Web database 300.

Those skilled in the art will recognize that the exemplary environment and components illustrated in FIGS. 2 and 3 are not intended to limit the present invention. As such, alternative hardware environments will be appreciated by those skilled in the art and may be used without departing from the scope of the present invention. Also, as will be appreciated, the present invention may be implemented as a method, apparatus, or article of manufacture using standard programming and engineering techniques to produce software, hardware, firmware, or any combination thereof. The term "article of manufacture" as used herein is intended to encompass logic and data embodied in or accessible from any computer usable storage media.

CONCLUSION

A system and method has been shown in the above embodiments for the effective implementation for automated access to web content based on log analysis. While various preferred embodiments have been shown and described, it will be understood that there is no intent to limit the invention by such disclosure, but rather, it is intended to cover all modifications and alternate constructions falling within the spirit and scope of the invention, as defined in the appended claims. For instance, while one embodiment uses proxy logs, any appropriate manner of maintaining a log of valid accesses is appropriate. As an example, individual users maintain a log, in the form of the history list, in their browser, which may be used.

The invention claimed is:

1. A method of determining parameter combinations for automated web crawler access to World Wide Web content that is accessible based on parameters resulting from real user interactions with a World Wide Web site, said method comprising:
   maintaining at least one log file containing user queries resulting from previous real user HTML interactions with said World Wide Web, said user queries comprising entries;
   analyzing said log file to determine parameter combinations and to generate synthetic queries for input to said web crawler, said web crawler using said input for automated access to said World Wide Web content, said analyzing step further comprising: ranking entries according to their frequency of occurence; for a set of entries resulting from unlimited text entries, excluding entries ranked below a predetermined number; and
   wherein said synthetic queries are determined by producing combinations of entries from each set of entries.

2. A method of determining parameter combinations for automated access to World Wide Web content that is accessible based on parameters resulting from real user interactions with a World Wide Web site, as per claim 1, wherein said synthetic queries are determined by producing all combinations of entries from each set of entries.

3. A method of determining parameter combinations for automated access to World Wide Web content that is accessible based on parameters resulting from real user interactions with a World Wide Web site, as per claim 1, wherein entries resulting from limited text entries and unlimited text entries have stop words removed and remaining words stemmed.

4. A method of determining parameter combinations for automated access to World Wide Web content that is accessible based on parameters resulting from real user interactions with a World Wide Web site, as per claim 1, wherein said log file is maintained by a proxy server that logs communications between a client and a Web server resulting from real user accesses to said World Wide Web content.

5. A method of increasing web crawler penetration of Web databases accessible via HTML forms, said method comprising:
   reviewing previous real user form input data, said previous real user form input data maintained in a log file, said log file maintained in a proxy server;
   identifying possible HTML form input data for said Web crawler from said previous real user form input data by synthesis of entries for any of: predefined sets, limited text entries or unlimited text entries; and
   providing said identified form input data to said Web crawler during an instantiation of automated access to said Web databases by said Web crawler.

6. A method of increasing web crawler penetration of Web databases accessible via HTML forms, as per claim 5, wherein said synthesis comprises:
   ranking any entries for predetermined sets;
   ranking any entries for limited text entries;
   ranking any entries for unlimited text entries;
   excluding entries for unlimited text entries ranked below a predetermined number; and
   pairing entries from each set of ranked entries.

7. A method of increasing web crawler penetration of Web databases accessible via HTML forms, as per claim 6, wherein said synthesis further comprises:
   removing stop words and stemming remaining words for entries resulting from limited text entries and unlimited text entries.

8. A method of emulating real user access to World Wide Web content dynamically accessible via an HTML form, said method comprising:
   maintaining a log containing real user entries into each input item of said HTML form;
   ranking entries for each input item according to their frequency of occurrence;
   for each unlimited text entry input item, excluding entries ranked below a predetermined number;
   determining combinations of entries from each set of entries; and
   emulating real user access to World Wide Web content dynamically accessible via an HTML form by automatically accessing said content using said combinations of entries as HTML input for a webcrawler.

9. A method of emulating real user access to World Wide Web content dynamically accessible via an HTML form, as per claim 8, wherein entries resulting from limited text entries and unlimited text entries have stop words removed and remaining words stemmed.

10. A method of emulating real user access to World Wide Web content dynamically accessible via an HTML form, as per claim 8, wherein said log file is maintained by a proxy server that logs communications between a client and a Web server resulting from real user accesses to said World Wide Web content.

* * * * *